(12) United States Patent
Istre

(10) Patent No.: US 8,122,551 B2
(45) Date of Patent: Feb. 28, 2012

(54) FOUR WHEELER TRAILER LOADING RAMPS

(76) Inventor: John Istre, Morgan City, LA (US)

( * ) Notice: Subject to any disclaimer, the term of this patent is extended or adjusted under 35 U.S.C. 154(b) by 0 days.

(21) Appl. No.: 12/558,542

(22) Filed: Sep. 13, 2009

(65) Prior Publication Data

US 2011/0061182 A1      Mar. 17, 2011

(51) Int. Cl.
*E01D 1/00* (2006.01)
(52) U.S. Cl. .......................... 14/69.5; 14/71.1
(58) Field of Classification Search .......... 14/69.5–72.5
See application file for complete search history.

(56) References Cited

U.S. PATENT DOCUMENTS

| | | | | |
|---|---|---|---|---|
| 3,510,015 | A * | 5/1970 | Roshaven | 414/537 |
| 3,642,156 | A * | 2/1972 | Stenson | 414/537 |
| 5,306,513 | A * | 4/1994 | Colucci et al. | 426/139 |
| 5,517,708 | A * | 5/1996 | Baranowski | 14/69.5 |
| 5,533,762 | A * | 7/1996 | Carmona | 285/101 |
| 5,553,762 | A * | 9/1996 | Brown | 224/403 |
| 5,769,593 | A * | 6/1998 | Buffaloe | 414/537 |
| 5,933,898 | A * | 8/1999 | Estes et al. | 14/69.5 |
| 5,988,725 | A * | 11/1999 | Cole | 296/61 |
| 6,447,040 | B1 * | 9/2002 | Young, Sr. | 296/61 |
| 6,536,064 | B1 * | 3/2003 | Swink et al. | 14/69.5 |
| 7,179,042 | B1 * | 2/2007 | Hartmann et al. | 414/537 |
| 7,350,843 | B2 * | 4/2008 | Meyers et al. | 296/50 |
| 2002/0031422 | A1 * | 3/2002 | Schilling | 414/477 |
| 2003/0049113 | A1 * | 3/2003 | Overbye | 414/537 |
| 2005/0063810 | A1 * | 3/2005 | Wagner | 414/537 |
| 2007/0138784 | A1 * | 6/2007 | Jager | 280/839 |
| 2008/0292438 | A1 * | 11/2008 | Patterson | 414/537 |
| 2009/0016865 | A1 * | 1/2009 | Astor et al. | 414/430 |
| 2009/0066061 | A1 * | 3/2009 | Winter et al. | 280/639 |
| 2009/0155034 | A1 * | 6/2009 | Fonseca, Jr. | 414/480 |
| 2009/0214325 | A1 * | 8/2009 | White | 414/537 |
| 2009/0224512 | A1 * | 9/2009 | Winter et al. | 280/639 |

* cited by examiner

*Primary Examiner* — Raymond Addie
(74) *Attorney, Agent, or Firm* — Jerry D. Haynes; The Law Offices of Jerry D. Haynes

(57) ABSTRACT

The present invention relates to a loading ramp for loading an all terrain vehicle for transport purposes comprising: a center plate, where said center plate includes a mounting plate and at least one mounting pin as a means to attach the loading ramp to a trailer; at least one truck bed plate, where said truck bed plate extends from the center plate into a bed of a truck; at least one trailer plate, where said trailer plate extends from the center plate into the trailer; and a plurality of pipe hinges, where said pipe hinges adjoin the at least one truck bed plate, center plate and the at least one trailer plate. The truck bed plates and trailer plates may be extended for loading purposes or folded and adjoined for storage purposes.

4 Claims, 3 Drawing Sheets

FOUR WHEELER TRAILER LOADING RAMPS

BACKGROUND OF THE INVENTION

1. Field of Invention

The present invention relates to a loading ramp that may be utilized with a trailer that transports an all-terrain or four-wheel type of vehicle.

2. Description of Related Art

Many individuals enjoy recreational all-terrain vehicles (ATV) that are utilized for off road adventures through the countryside. These small vehicles are usually loaded into trailers or directly into the bed of a pickup truck for transportation to the desired area of use. The all-terrain vehicle may be driven on a wider variety of terrain than your normal street vehicle. Although the operation an ATV is similar to a motorcycle, the ATV usually includes four wheels and travels at slower speeds as compared to a motorcycle. Although some ATVs are legal to drive on a street or road, most of the time ATV's are driven in the open countryside area and are transported to off road locations.

Many times trailers are provided to transport the four-wheel ATV where the trailer is hitched to a pickup truck. On occasion where more than one ATV is being transported, an ATV may be loaded into the flatbed of the truck and another one in the trailer that is hitched to the truck. In order to transport ATV's in this manner, it is required that the trailer be unhitched in order to load one ATV into the bed area of a truck. Presently an effective mechanism or device does not exist that may assist in the loading of the truck bed without the necessity of removing the trailer.

Examples of loading ramps designed for ATV vehicles are prevalent in the prior art. One particular example, U.S. Pat. No. 4,478,549 discloses a foldable ramp for on/off loading of all-terrain recreational vehicles from the rear of trucks, trailers and vans. The ramp of the '549 patent may be folded and stored under the wheelbase of the all-terrain vehicle when not being used.

U.S. Pat. No. 4,700,421 discloses a ramp assembly that provides for the loading of small off-the-road vehicles onto and unloading such vehicles from the bed of a pickup truck. The ramp assembly of the '421 patent includes flexible support such as a sheet of lightweight chain link that is connected to the upper end of the corner post of a truck bed during the loading of the vehicle into the truck. As demonstrated above a variety of ramps are provided for loading vehicles directly onto the bed of a truck however little exists to assist in the direct loading of a vehicle from an ATV trailer to the bed of a pickup truck.

SUMMARY OF THE INVENTION

The present invention relates to a loading ramp for loading an all terrain vehicle for transport purposes comprising: a center plate, where said center plate includes a mounting plate and at least one mounting pin as a means to attach the loading ramp to a trailer; at least one truck bed plate, where said truck bed plate extends from the center plate into a bed of a truck; at least one trailer plate, where said trailer plate extends from the center plate into the trailer; and a plurality of pipe hinges, where said pipe hinges adjoin the at least one truck bed plate, center plate and the at least one trailer plate. The loading ramp according to the present invention may be placed in a first position for loading purposes, where the at least one truck bed plate extends from the center plate into the truck bed, and the at least one trailer plate extends from the center plate into the trailer. Alternatively for storage purposes the loading ramp according to the present invention may be placed in a second position, where the at least one truck bed plate and the at least one trailer plate fold and adjoin.

In one particular embodiment, the loading ramp according to the present invention includes: a center plate, where said center plate includes a mounting plate and at least one mounting pin as a means to attach the loading ramp to a trailer; two truck bed plates, where said truck bed plates extend from the center plate into a bed of a truck and a pipe hinge connects the two truck bed plates; two trailer plates, where said trailer plates extend from the center plate into the trailer and a pipe hinge connects the two trailer plates; and a pair of pipe hinges, where said pipe hinges adjoin the truck bed plates and the trailer plates to the center plate.

DETAILED DESCRIPTION

The present invention provides a loading ramp that may be used for loading a four-wheel ATV directly from a trailer into the flatbed of a pickup truck. The loading ramp according to the prevent invention obviates the need for unhitching the trailer from the pickup truck. The elimination of this step therefore provides a more efficient and direct method of loading an ATV into the bed of a pickup truck while transporting more than one ATV vehicle with a single truck.

Figure 1:
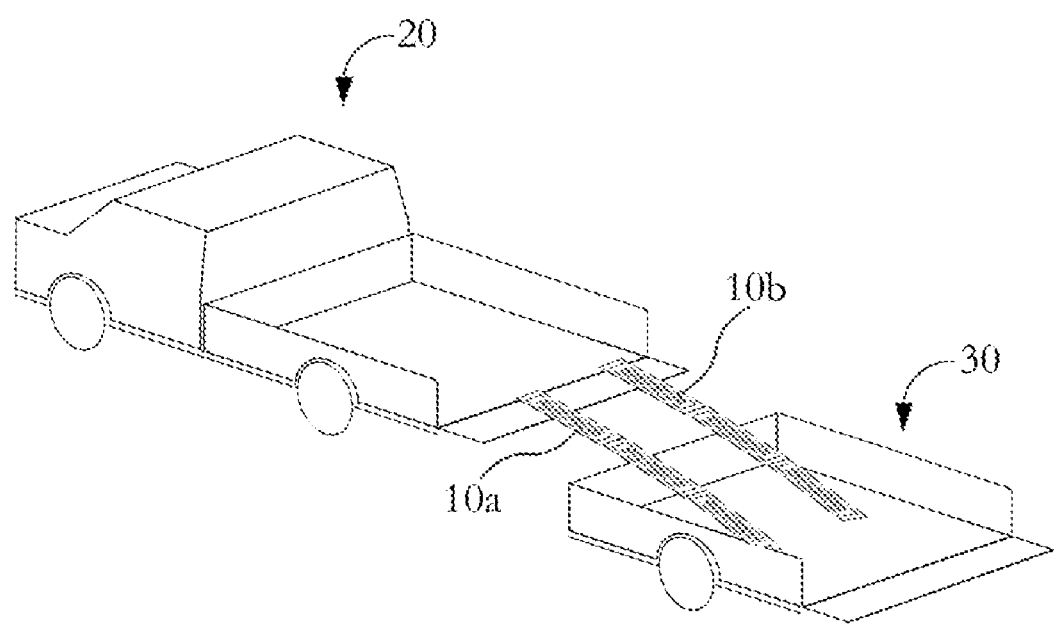
FIG. 1 provides a perspective view of the use of loading ramps according to the present invention.

FIG. 1 depicts a perspective view of loading ramps 10a, 10b for loading an ATV between a pickup truck 20 and a trailer 30. As depicted, the ramps extend into the trailer 30 and into the portion of the gate of the pickup truck 20. Once these ramps are in place, the user thereof may easily drive and transport the ATV into the bed of the pickup truck 20 directly from the trailer 30. The loading ramps 10a, 10b according to the present invention are securely attached to the rail portion of trailer 30 during the loading and unloading of the vehicle. Once the loading or unloading process has been completed these ramps may be easily folded and released for storage purposes.

Figure 2:
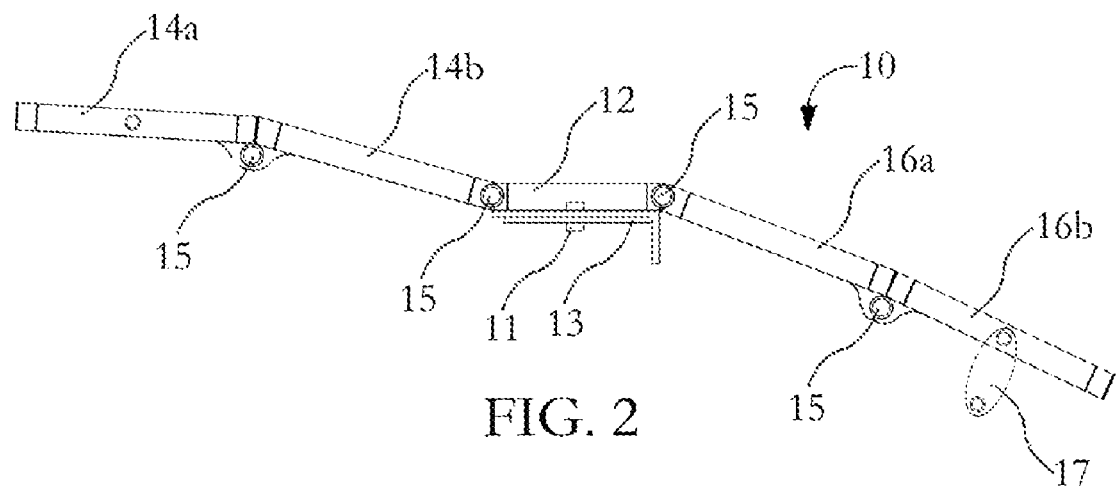
FIG. 2 depicts a side view of an exemplary loading ramp according to the present invention.

FIG. 2 depicts the side view of a loading ramp 10 according to the present invention. The loading ramp 10 includes the truck bed plates 14a, 14b, a center plate 12 and two trailer plates 16a, 16b. The trailer plate 16a, 16b extend into the trailer and the truck bed plates 14a, 14b extend into the truck bed. The loading ramp 10 is attached to the trailer rail at the center plate 12. A mounting pin 11 mounts the ramp 10 onto the mounting plate 13 which is attached to the trailer rail which is shown more clearly in FIG. 5. The secured attachment of the loading ramp 10 provides a means to allow the loading of an ATV from the trailer into the flatbed truck. Pipe hinges are provided to connect the plates together. Pipe-hinges 15 are positioned along the path of the loading ramp 10. As noted the pipe-hinge 15 provides a means to have a slight angle at the midpoint between the respective loading plates of the loading ramp 10.

Figure 3:
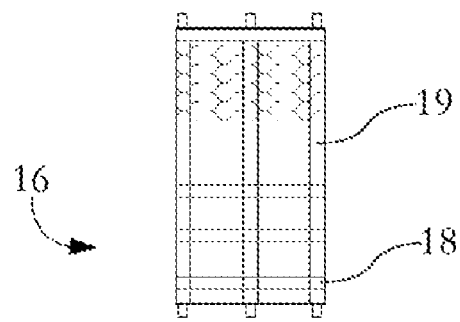
FIG. 3 depicts a sectional view of the loading ramp according to the present invention.

FIG. 3 shows a top sectional view of a plate utilized on loading ramp 10. As shown the plate 16 includes square tubing 19 on both sides and through the middle section thereof. Reinforcing round bars 18 are used to reinforce the square tubing 19 and are positioned perpendicular thereto. This configuration provides a strong platform for the transfer of the ATV during the loading and unloading process.

Figure 4:
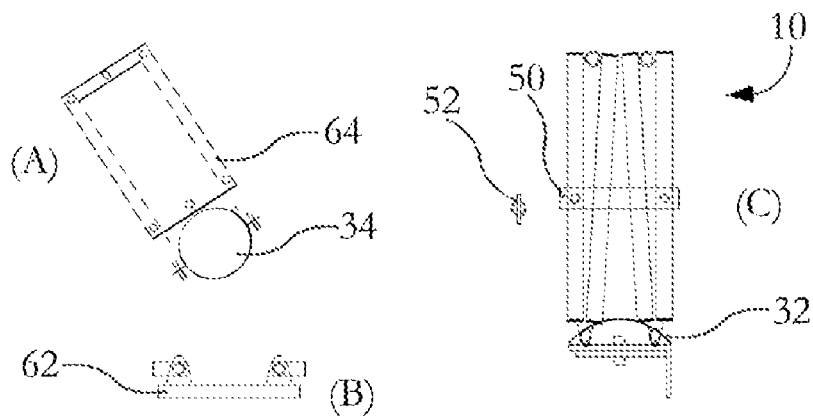
FIG. 4 shows a view of the loading ramp according to the present invention in a folded position.

FIG. 4 depicts some additional details of the loading ramp 10. As shown in FIG. 4(A), the loading ramp 10 may include a center plate 64 that is adapted for pipe rails on the trailer. The mounting plate 64 is shown abutting a trailer pipe rail 34. An under plate 62 shown in FIG. 4(B) is utilized to join the mounting plate 64 to a pipe rail that may be part of the construction of a trailer. FIG. 4(C) shows a loading ramp 10 in a folded position. As depicted snap pins 52 are utilized to join a connector 50 to hold the loading ramp 10 in a closed position. In one exemplary embodiment, the loading ramp 10 may remain connected to the trailer during transport as shown with the mounting pin 11 and mounting plate 13. A removable hinge pin 32 is inserted in the hinge pins to lock and secure the sections of the loading ramp in a closed position.

Figure 5:
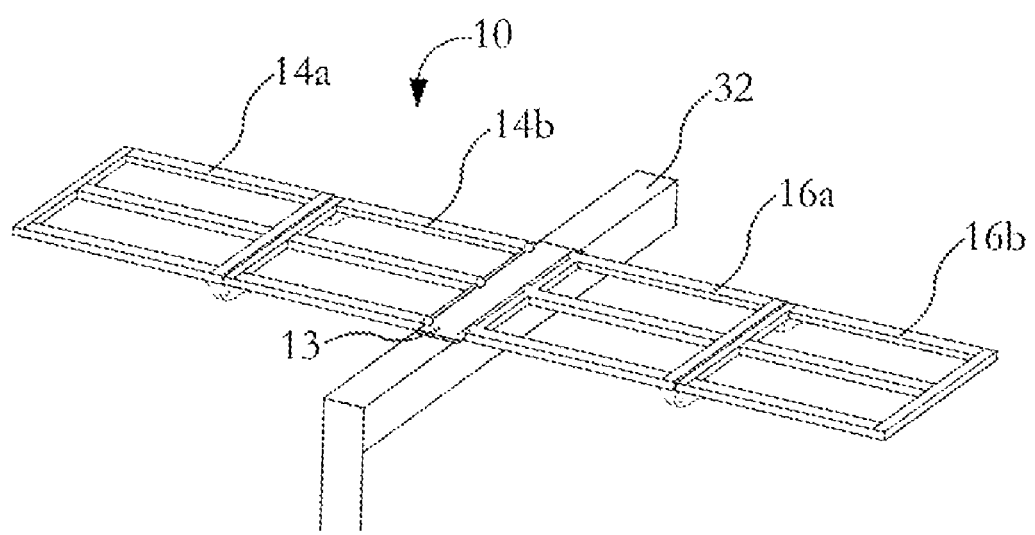
FIG. 5 depicts the attachment of the loading ramp onto the trailer rail as contemplated by the present invention.

FIG. 5 provides a sectional perspective view of a loading ramp 10 as attached to a trailer rail 32. The mounting plate 13 with the use of mounting pins secures the loading ramp 10 onto the trailer rail as depicted. The trailer rail 32 depicted in FIG. 5 is a square trailer rail that is commonly used on trailers. The trailer portions 16a, 16b extend downward into the trailer and the truck bed portion of 14a, 14b extend into the truck bed.

Use of the loading ramp 10 according to the present invention provides a method of loading multiple recreation vehicles into a hitched trailer and into the bed of the truck without the necessity of unhitching the trailer. The loading ramp according to the present invention may be bolted into the rails of the trailer and then stored in a folded position when not being used. The loading ramps are easily detachable and may be removed and reassembled onto the trailer as needed. In one particular embodiment of the present invention, the individual plates may be about 21 inches in length and 12 inches in width. Such a measurement may optimize functionality of the loading ramp according to the present invention.

What is claimed is:

1. A method of loading an all terrain vehicle (ATV) by using a loading ramp comprising the steps of:
    attaching a center plate of said loading ramp to a trailer rail of a trailer;
    extending two truck bed plates attached to said center plate onto a truck bed;
    extending two trailer plates attached to said center plate into said trailer hitched to said truck bed; and
    loading the ATV from said trailer onto said truck bed by utilizing said loading ramp.

2. The method of using the loading ramp according to claim 1 further comprising the step of folding said truck bed plates and said trailer plates into a closed position for storage.

3. The method of using the loading ramp according to claim 2 further comprising the step of holding said loading ramp in said closed position with a connector and at least one snap pin.

4. The method of using the loading ramp according to claim 3 further comprising the step of loading a second ATV onto said trailer when said loading ramp is in said closed position.

* * * * *